Sept. 28, 1965
R. J. HOLTON
3,208,122
FASTENERS
Filed Feb. 14, 1963
2 Sheets-Sheet 1
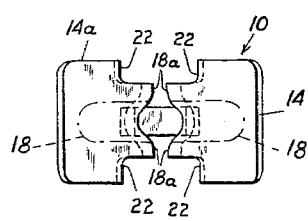
Fig. 1
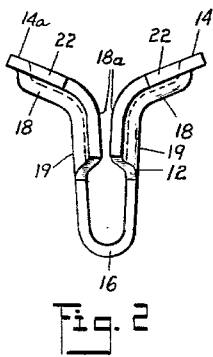
Fig. 2
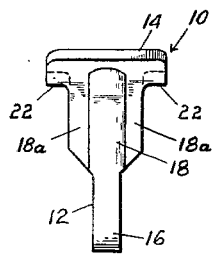
Fig. 3
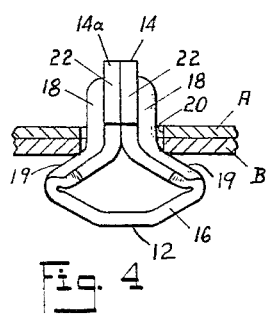
Fig. 4
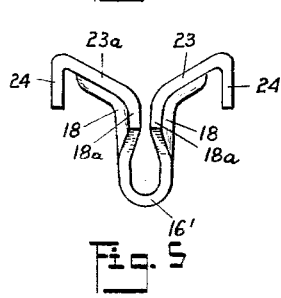
Fig. 5
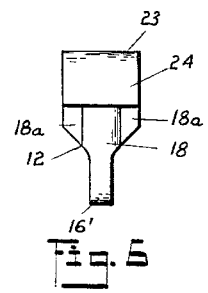
Fig. 6
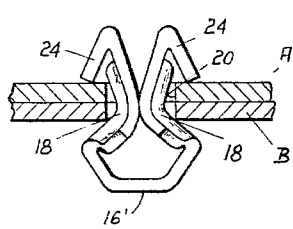
Fig. 7
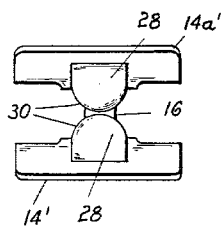
Fig. 8
Fig. 9
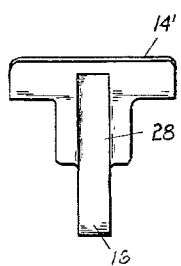
Fig. 10
INVENTOR.
ROBERT J. HOLTON
BY
Teare, Fetzer + Teare
ATTORNEYS Sept. 28, 1965     R. J. HOLTON     3,208,122
FASTENERS
Filed Feb. 14, 1963     2 Sheets-Sheet 2
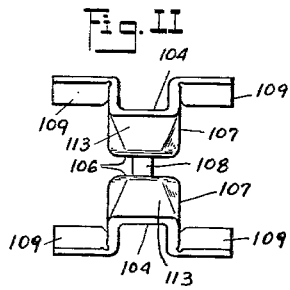
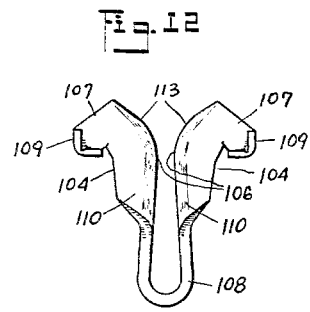
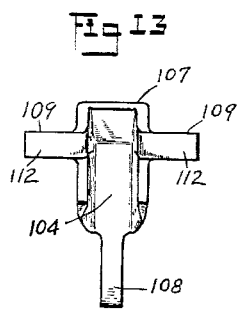
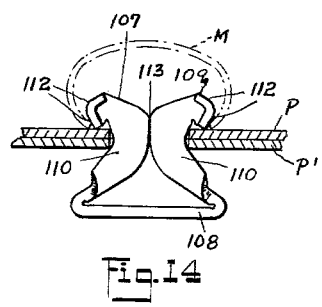
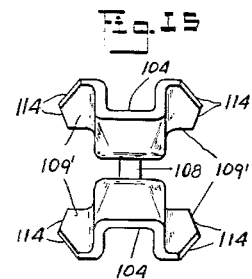
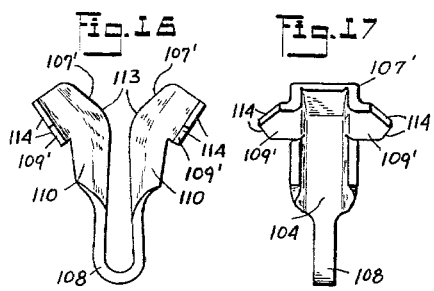

ced Sept. 28, 1965

**3,208,122
FASTENERS**
Robert J. Holton, Cleveland, Ohio, assignor to Tinnerman Products, Inc., Cleveland, Ohio, a corporation of Ohio
Filed Feb. 14, 1963, Ser. No. 258,494
8 Claims. (Cl. 24—73)

This invention relates in general to fastening means and more particularly to malleable-like, deformable, fasteners, for the securing of two or more members together, such as a pair of metal panels, or the securing of, for instance, a molding to a panel.

The fastener means of the instant invention is adapted to be used in place of sheet metal screws, or nuts and bolts, and may be expeditiously and radily applied to a panel, and secured thereto, and which will effectively couple together the two or more members, which are to be attached.

Accordingly, it is an object of the instant invention to provide a deformable fastener, which may be readily inserted through aligned openings in two or more members, or through an opening in only one of the members, and deformed to a holding position, for securely attaching the members together.

Another object of the invention is to provide various forms of fasteners for tying or fastening together a pair of members, such as a pair of superimposed panels, and wherein the fastener comprises a comparatively small, inexpensive member of malleable-like sheet metal, which fastener is adapted to extend through apertures in the panel members, and to be deformed when in such aperture, into secured engagement with the panel members.

Another object of the invention is to provide a malleable-like, sheet metal fastener, adapted to secure a pair of members together, such as for instance a pair of panel members having aligned apertures therethrough, and wherein the fastener comprises a loop-like body portion, adapted to extend through the apertured panels, and a pair of tab portions connected to said body portion and projecting therefrom, and wherein the fastener is adapted to be deformed upon relative movement between the tab portions, such movement causing deformation of the body portion, for securing the fastener to the supporting panel member.

A more specific object of the invention is to provide a fastener of the latter type wherein the tab portions diverge outwardly with respect to one another and wherein there is provided fulcrum means on the fastener adapted for coaction upon movement of the tab portions toward one another, to facilitate deformation of the loop-like body portion into secured relation on the supporting members.

Other objects and advantages of the invention will be apparent from the following description taken in conjunction with the accompanying drawings wherein:

FIG. 1 is a top plan view of a fastener constructed in accordance with the instant invention;

FIG. 2 is a side elevational view of the fastener of FIG. 1;

FIG. 3 is an end elevational view of the fastener of FIG. 1;

FIG. 4 is a side elevational, partially sectioned view of the fastener of FIGS. 1 to 3, showing such fastener in mounted, deformed condition on a pair of apertured supporting panels, and securing such panels together;

FIG. 5 is a side elevational view of a modified form of fastener as compared to that of FIGS. 1 to 4;

FIG. 6 is an end elevational view of the fastener illustrated in FIG. 5;

FIG. 7 is a side elevational, partially sectioned view showing the fastener of FIGS. 5 and 6 mounted in secured deformed relation on a pair of apertured panels, and attaching the latter together;

FIG. 8 is a top plan view of another embodiment of the fastener of the invention;

FIG. 9 is an end elevational view of the fastener of FIG. 8;

FIG. 10 is a side elevational view of the fastener of FIGS. 8 and 9;

FIG. 11 is a top plan view of another embodiment of the fastener of the invention;

FIG. 12 is an end elevational view of the fastener illustrated in FIG. 11;

FIG. 13 is a side elevational view of the fastener illustrated in FIGS. 11 and 12;

FIG. 14 is an elevational section showing the fastener of FIGS. 11 to 13 mounted in deformed condition on a supporting panel; in phantom lines there is illustrated a resilient snap-type molding secured to the panel by the head of the fastener;

FIG. 15 is a top plan view of a further embodiment of the fastener of the invention;

FIG. 16 is an end elevational view of the fastener illustrated in FIG. 15; and

FIG. 17 is a side elevational view of the fastener illustrated in FIGS. 15 and 16.

Referring now again to the drawings and in particular to FIGS. 1, 2, 3 and 4 thereof, there is shown a fastener or clip 10 comprising a generally vertically oriented, loop-like body portion 12, having upper tab portions 14, 14a, diverging outwardly with respect to one another and with respect to the body portion 12. The fastener 10 may be formed from a single piece of deformable malleable-like material, such as for instance sheet metal, and for example cold rolled steel. Such malleable-type metal possesses the characteristic that it may be generally permanently deformed upon application of predetermined force, as distinguished from a purely spring type metal which when bent will generally return to its original position upon removal of the bending or distorting force.

The clips may be formed from blanks having outlines of paired, generally T-shaped configurations connected by a reduced width strap 16, which may be subsequently bent into the configuration illustrated, for use in attaching two members, such as for instance two apertured panels A and B together. As can be best seen in FIGS. 1 and 2, the generally angular T-shaped sections of the clip are preferably deformed or embossed outwardly as at 18, to add strength to such clip sections, and also to provide confronting fulcrum portions 18a (FIG. 1) adapted for engagement with one another upon movement of the tabs 14, 14a toward one another, to deform or collapse the looped strap portion 16 of the clip, into secured relation on the panel, and as shown in FIG. 4.

Referring to FIG. 3 it can be seen that the loop-like strap portion 16 is of a materially lesser width as compared to for instance the generally T-shaped portions of the clip, and of a lesser width than even the ribs 18 formed by deformation of the T-shaped portions of the clip. Accordingly upon application of inward pressure on the tabs 14, 14a of the clip, as for instance by a pair of pliers operated by a workman, the confronting fulcrum portions 18a engage one another and then the pivoting of the tabs toward one another causes outward movement of lever sections 19 away from one another and deformation of the thinned out loop portion 16, in the general manner illustrated in FIG. 4, resulting in collapsing of the loop 16 and the securing of the fastener to the supporting panels A and B, thus locking the panels together.

The openings 20 in panels A and B, through which the fastener 10 extends, may be of any desired configuration but are preferably of generally circular configuration, which is usually the most economical type of opening to provide, and the fastener 10 is initially easily received through such openings 20 preparatory to deforming the same into secured position on the panels. The laterally projecting wing portions 22 of the fastener tabs are adapted to engage the uppermost A of the panels, and the collapsing of the loop portion 16 causes the embossments or ribs 18 to cam against the defining boundary of the opening on the underside of the lower panel B, and urge the panels into tight fitting abutting engagement. It will be noted that substantially all deformation of the clip or fastener 10 occurs in the loop portion 16. Once the fastener is deformed into its secured relation on the panels A and B, the loop portion 16 which has been deformed into a more or less linear configuration, acts as a beam extending between the T-shaped sections of the fastener, to prevent pivoting of the tab portions 14, 14a away from one another, and thus assures that the fastener is maintained in secured relation on the panels to positively secure the latter together. It will also be seen that such fastener can readily attach greater or varying thicknesses of panels together.

The fastener illustrated in FIGS. 5, 6 and 7 is of the same general type as that illustrated in FIGS. 1 through 4 inclusive, except that the tab portions 23, 23a do not have the wings 22 of the first described embodiment, but instead are of generally rectilinear configuration and have downwardly extending arms 24 projecting from each of the tabs 23, 23a. Such downwardly extending arms are adapted for engagement with the confronting panel A in a similar manner as the wings 22 on the first described fastener, and serve as abutments for preventing movement of the fastener through the openings 20 in one axial direction. The fastener of FIGS. 5 to 7, and particularly the loop-like strap portion 16′, is deformed in a similar manner as aforedescribed in connection with the fastener of FIGS. 1 through 4, and secures the panels A and B together similarly to that aforediscussed, with the exception that the arms 24 may be bent or deformed inwardly with respect to the respective tab upon being squeezed between the jaws of the workman's pliers. Arms 24, as they are bent, thus tend to pull the fastener up through the panel hole.

FIGS. 8 through 10 show another embodiment of fastener which is generally similar to that of FIGS. 1 through 4, including the substantially confronting, generally T-shaped portions, except that the rib or boss portions 28 are directed inwardly rather than outwardly, and the curved confronting surfaces 30 thereof form a fulcrum for pivoting of the tabs 14′, 14a′ of said T-shaped portions toward one another, and deformation of the loop portion 16 of the fastener. In other respects, the fastener is substantially identical to that of the FIGS. 1 to 4 embodiment, and operates in the same way as that aforediscussed in connection with said embodiment, for fastening two members together.

FIGS. 11 through 14 disclose a high strength fastener embodiment which is generally similar to that shown, for instance in FIGS. 8, 9 and 10, including substantially confronting generally T-shaped portions, which are generally channel-like, and with the rib or boss portions 104 being directed inwardly and providing curved, confronting surfaces 106 forming fulcrum means for pivoting or rocking of the tabs 107 of the T-shaped portions toward one another, and resultant deformation of the thinned out loop portion 108 of the fastener. The laterally projecting wing portions 109 of the tabs 107 are of an angled configuration as best shown in FIG. 12, and which wing portions 109, upon rocking of the tabs toward one another, thereby causing outward movement of the lever sections 110 of the T-shaped portions, away from one another, form outer cam surfaces 112 adapted to coact in camming holding coaction with conventional, generally inverted U-shaped spring or resilient molding M (FIG. 14) for holding the molding in interlock condition on the panel. It will be seen that such molding attaching surfaces 112 extend in directions generally transverse of the directions of deformation of the loop portion 108, as can be best seen in FIGS. 12 and 14. In other words the molding or trim strip M will run generally transverse to the directions of deformation of loop portion 108. The tab portions 107 are preferably provided with substantially flat surfaces 113 which are adapted for engagement (FIG. 14) when the fastener is in completely deformed condition on the supporting panel, for insuring the proper orientation of the "trim" coupling wings 109 receiving the resilient trim strip.

FIGS. 15 to 17 show the same general type of high strength fastener construction as that of FIGS. 11 through 14, including the inwardly directed rib or boss portions 104. However, in this arrangement, the ends of the wing portions 109′ of the tabs 107′ are utilized instead of the outer surfaces of the wings, for connecting a trim strip to the panel. In other words, angularly disposed cam surfaces 114 are provided on each end of the wings 109′ which are adapted to receive in snap fastening holding coaction a trim strip. It will be noted that with such an arrangement, the trim strip will run in the same directions as the directions of deformation of the loop portion 108. In all other respects, the fastener of FIGS. 15 through 17 may be substantially identical to that of FIGS. 11 through 14.

From the foregoing description and accompanying drawings, it will be seen that the invention provides a deformable fastener which is adapted to be inserted through an aperture or opening in a supporting member such as for instance a panel or panels, and which is adapted to be deformed into a holding position for securely attaching two or more members together. The invention also provides a fastener which comprises a loop-like body portion and a pair of actuating tabs movable with respect to one another to cause deformation of the body portion into a locking condition on an apertured support panel.

The terms and expressions which have been used are used as terms of description, and not of limitation, and there is no intention in the use of such terms and expressions of excluding any equivalents of any of the features shown or described, or portions thereof, and it is recognized that various modifications are possible within the scope of the invention claimed.

I claim:

1. A deformable fastener adapted for insertion into an opening through a supporting panel, said fastener being formed from a single blank comprising a generally vertically oriented, loop-like body portion adapted to be received through the opening in said panel, and a pair of tab portions projecting upwardly from the body portion and disposed in generally spaced relationship with respect to one another, generally vertically oriented angular portions disposed in generally confronting relationship and defining said tab portions and having a relatively greater cross-sectional strength as compared to the cross-sectional strength of said body portion to facilitate spreading deformation of said body portion, said loop portion depending from and being connected to said angular portions, said tab portions being adapted for engagement with one side of said panel for maintaining the fastener in mounted relation on said panel, and means including fulcrum areas on said angular portions and disposed in confronting relationship for engagement against one another to cause rocking movement of said angular portions upon pivotal movement of said tab portions toward one another to provide the spreading deformation of said body portion.

2. A deformable fastener for mounting in an opening in a supporting panel, said fastener being formed of a single blank of sheet metal comprising, a head portion and a generally vertically oriented, loop-like body portion depending from said head portion, said head portion including a pair of confronting tabs connected to opposite sides of said body portion, and generally vertically oriented, angular T-shaped portions extending angularly outwardly from one another and defining said tabs and having a relatively greater cross-sectional strength as compared to the cross-sectional strength of said body portion to facilitate spreading deformation of said body portion, said loop portion depending from and being connected to said angular portions, a loop portion remote from said head portion including a section of material of reduced width compared to the width of said head portion and tabs to facilitate deformation of said loop portion, and fulcrum areas on said angular portions disposed in confronting relationship for engagement against one another to cause rocking movement of said angular portions upon pivotal movement of said tabs toward one another to provide the spreading deformation of said loop portion in a generally opposite direction relative to movement of said tabs.

3. A fastener in accordance with claim 1, wherein each of said angular portions includes an embossment running generally vertically thereof, said embossement rigidifying the respective angular portions.

4. A fastener in accordance with claim 3, wherein said embossments project inwardly toward one another and provide said fulcrum areas for rocking movement of said angular portions.

5. A fastener in accordance with claim 3, wherein said embossments project outwardly away from one another, said fulcrum areas being disposed laterally of the embossments on the respective angular portions.

6. A fastener in accordance with claim 1, wherein said fastener includes confronting generally T-shaped portions diverging outwardly with respect to one another and defining said tab portions, said body portion depending from and being connected to said T-shaped portions.

7. A fastener in accordance with claim 6, wherein said generally T-shaped portions are channeled exteriorly defining curved confronting surfaces interiorly thereof to provide said fulcrum areas.

8. A fastener in accordance with claim 1, wherein said tab portions each include laterally projecting wing means for mounting an object, such as a molding, to said panel.

References Cited by the Examiner

UNITED STATES PATENTS 2,850,936  9/58  Poupitch _____ 85—37

FOREIGN PATENTS 563,799  8/44  Great Britain.

DONLEY J. STOCKING, *Primary Examiner.*